United States Patent [19]
Beck et al.

[11] Patent Number: 6,026,371
[45] Date of Patent: Feb. 15, 2000

[54] METHOD AND APPARATUS FOR ALLOWING ONLINE DIRECTORY PRODUCERS TO PREVIEW ADVERTISEMENT IN ONLINE DIRECTORY LISTINGS

[75] Inventors: Teresa Marie Beck, Sunrise, Fla.; Gerald Eugene Haegele, Raleigh, N.C.; Wendi Lynn Nusbickel, Delray Beach, Fla.

[73] Assignee: International Business Machines Corp., Armonk, N.Y.

[21] Appl. No.: 08/978,240

[22] Filed: Nov. 25, 1997

[51] Int. Cl.[7] .................................................. G06F 17/60
[52] U.S. Cl. .............................. 705/14; 707/10; 709/203; 709/219
[58] Field of Search .................................... 705/1, 10, 14; 395/200.31, 200.33, 200.35, 200.47, 200.48, 200.49; 707/201, 204, 501, 513, 10; 709/201, 203, 205, 217, 218, 219

[56] References Cited

U.S. PATENT DOCUMENTS

| | | | |
|---|---|---|---|
| 5,793,966 | 8/1998 | Amstein et al. | 395/200.33 |
| 5,829,001 | 10/1998 | Li et al. | 707/10 |
| 5,832,487 | 11/1998 | Olds et al. | 707/10 |
| 5,845,299 | 12/1998 | Arora et al. | 707/513 |
| 5,870,552 | 2/1999 | Dozier et al. | 395/200.49 |

*Primary Examiner*—Allen R. MacDonald
*Assistant Examiner*—Hlani M. Kazimi
*Attorney, Agent, or Firm*—Gunster, Yoakley, Valdes-Fauli & Stewart, P.A.; Jon A. Gibbons

[57] ABSTRACT

A method and system for permitting businesses and organizations to preview their customized Web-based advertisement in an Online directory listing. The method consists of: linking at least one database server to at least one Web server. The database server has a production database and a staging database wherein the staging database is a replica copy of the production database. Creating (or revising) custom multimedia advertisement material using a variety of widely available HTML (Hyper Text Markup Language) tools; importing the resulting HTML source and associated multimedia files into the staging database stored in the database server; and previewing the custom Web pages on the staging database as if they were running on the production database.

19 Claims, 5 Drawing Sheets

METHOD AND APPARATUS FOR ALLOWING ONLINE DIRECTORY PRODUCERS TO PREVIEW ADVERTISEMENT IN ONLINE DIRECTORY LISTINGS

FIELD OF THE INVENTION

The present invention relates to the field of computer network communications. More particularly, the present invention relates to Online or Web-based directory listings, such as Online Yellow Page directories, in which a method and system are disclosed that permit advertisers to preview their customized advertisements in Online directory.

BACKGROUND OF THE INVENTION

Traditional paper telephone directory listings such as the White Pages, Yellow Pages and industry-specific directory listings are well known. Online or Web-based directory listings are the Online analogues to their familiar, traditional paper counterparts. With the advent of the Internet and the Web (World-Wide-Web), many owners and publishers of these directories have begun to offer their services Online. These Online directory services are expanding beyond simply providing name, address and telephone information and have begun to offer E-mail directory listings, Web page address listings, fax directory listings, consumer tips directory listings, emergency provider directory listings and much more.

As in the traditional paper counterparts, the publishers of these Online directory listings sell advertising space to businesses and organizations to cover the expense of compiling these directories. One of the advantages to advertisers in the Web medium over the paper medium is the use of multimedia in advertising. Multimedia technologies such as text, graphics, audio and full motion video on the Web are becoming common.

Nevertheless, one of the challenges advertisers face in providing advertisements on the Web is keeping information current. The Web advertisement, even more than its paper counterpart, is susceptible to becoming quickly stale, unappealing and out-of-date. Web advertising that is months, weeks and sometimes even days old is much less effective than advertising that is frequently revised and updated. In addition, in many industries, the product cycle times have decreased, which in turn has accelerated the requirement to keep advertisements up to date.

Another challenge many businesses face with Online directory listings is the ability to preview their own custom advertising content in the manner it will be viewed by customers over the Web. Currently text only information can be scanned for unwanted or undesirable words prior to insertion into the Online directory database. However, multimedia data, such as audio, video and still images, however, cannot be inspected with the text only previewing techniques.

Still another challenge is for the providers or the producers of Online directory listing to preview advertising content in a manner it will be view by customers over the Web.

SUMMARY OF THE INVENTION

Briefly in accordance with the present invention, a method and system for permitting businesses and organizations to preview their customized Web-based advertisement in an Online directory listing. The method consists of: linking at least one database server to at least one Web server. The database server has a production database and a staging database wherein said staging database is a replica copy of said production database. Creating (or revising) custom multimedia advertisement material using a variety of widely available HTML (Hyper Text Markup Language) tools; importing the resulting HTML source and associated multimedia files into the staging database stored in the database server; and previewing the custom Web pages on the staging database as if they were running on the production database.

BRIEF DESCRIPTION OF THE DRAWING(S)

DESCRIPTION OF A PREFERRED EMBODIMENT

Figure 1:
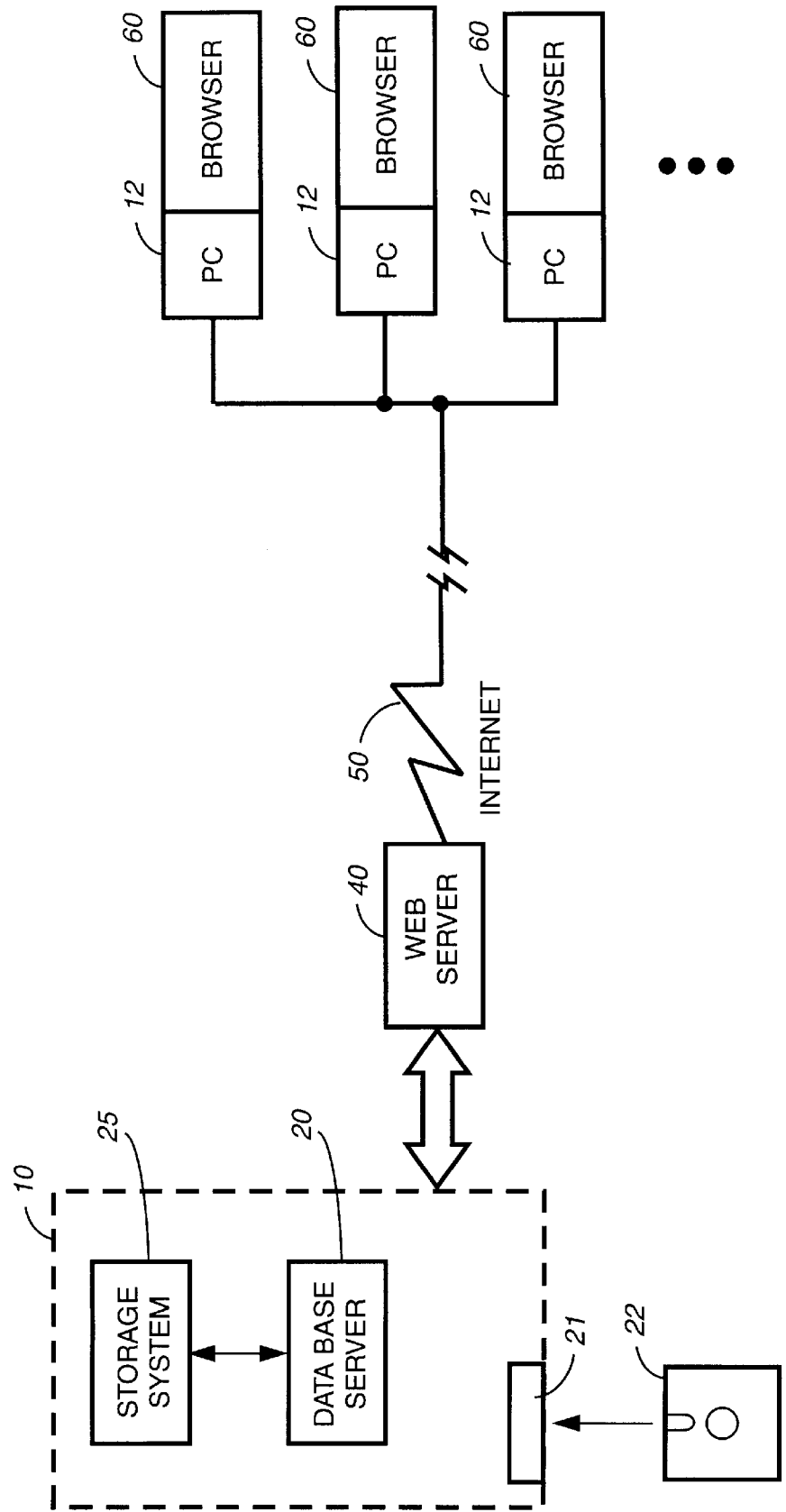
FIG. 1 is a functional block diagram of a typical prior art data processing system for hosting Web pages.

FIG. 1 depicts a functional block diagram of a typical data processing system for hosting Web pages 5. Web server 40 is connected to the Internet 50. A plurality of end-user data processing systems 12 with Web browser 60 are connected to Internet 50. Web browser 60 are client software programs based upon HTTP (Hyper-Text-Transfer-Protocol) compatible product such as Netscape Navigator, JAVA Browser or Microsoft Internet Explorer.

Figure 2:
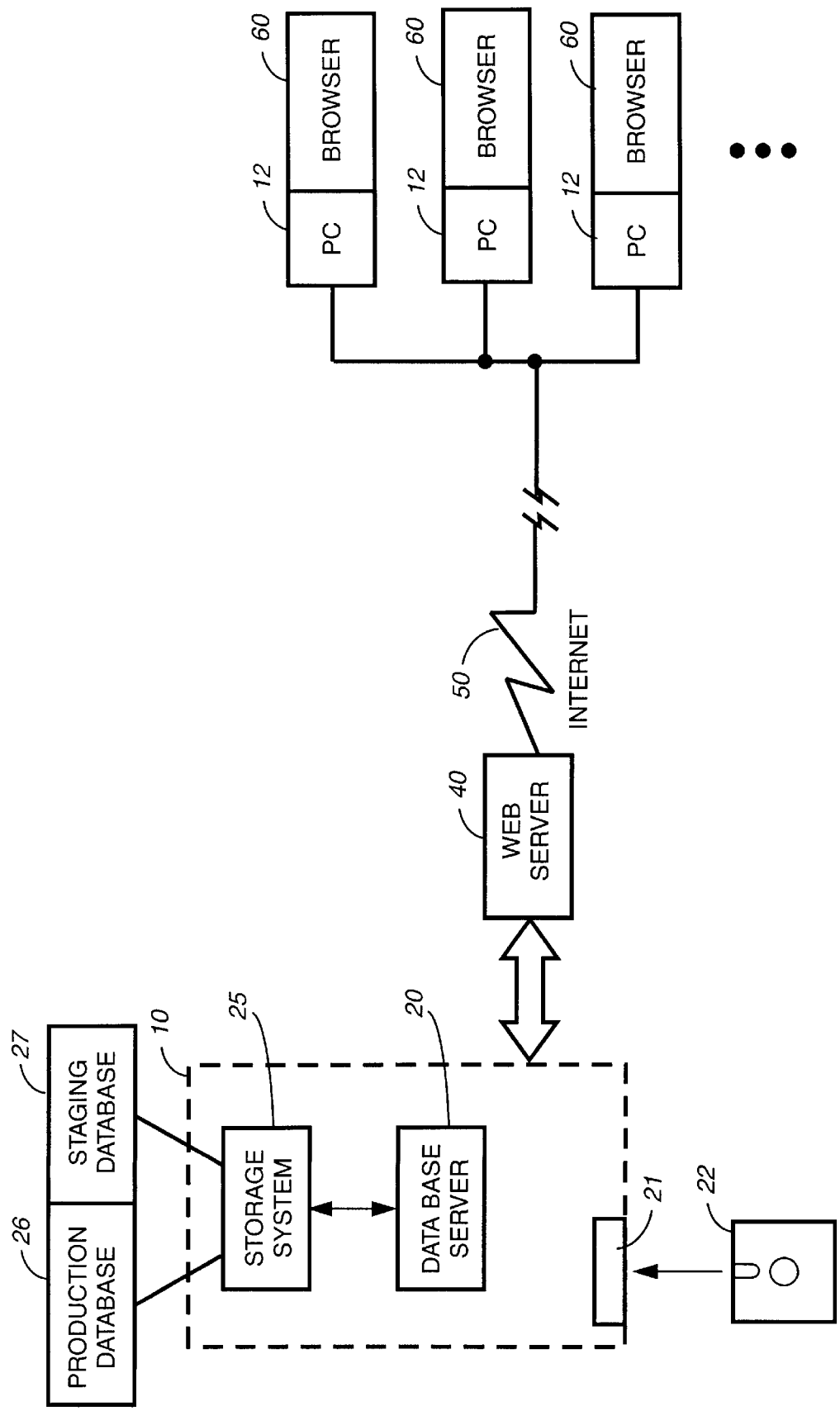
FIG. 2 is a functional block diagram of a data processing system for hosting Web-based Online directory listing services.

Referring now to FIG. 2, there is shown an Online directory listing system 10 in accordance with the invention. Online directory listing system 10 expands the information processing system for hosting Web pages 5 of FIG. 1 through the addition of a database server 20. Typically publishers of directory listings such as regional telephone companies provide the name, address, and telephone directory listing information for database server 20. It is important to point out that the precise operating systems and hardware configurations of database server 20, Web server 40, and Web-browser 60 are not limited to any specific hardware or software configuration. These systems can be implemented on a wide variety of hardware and software platforms.

Figure 3:
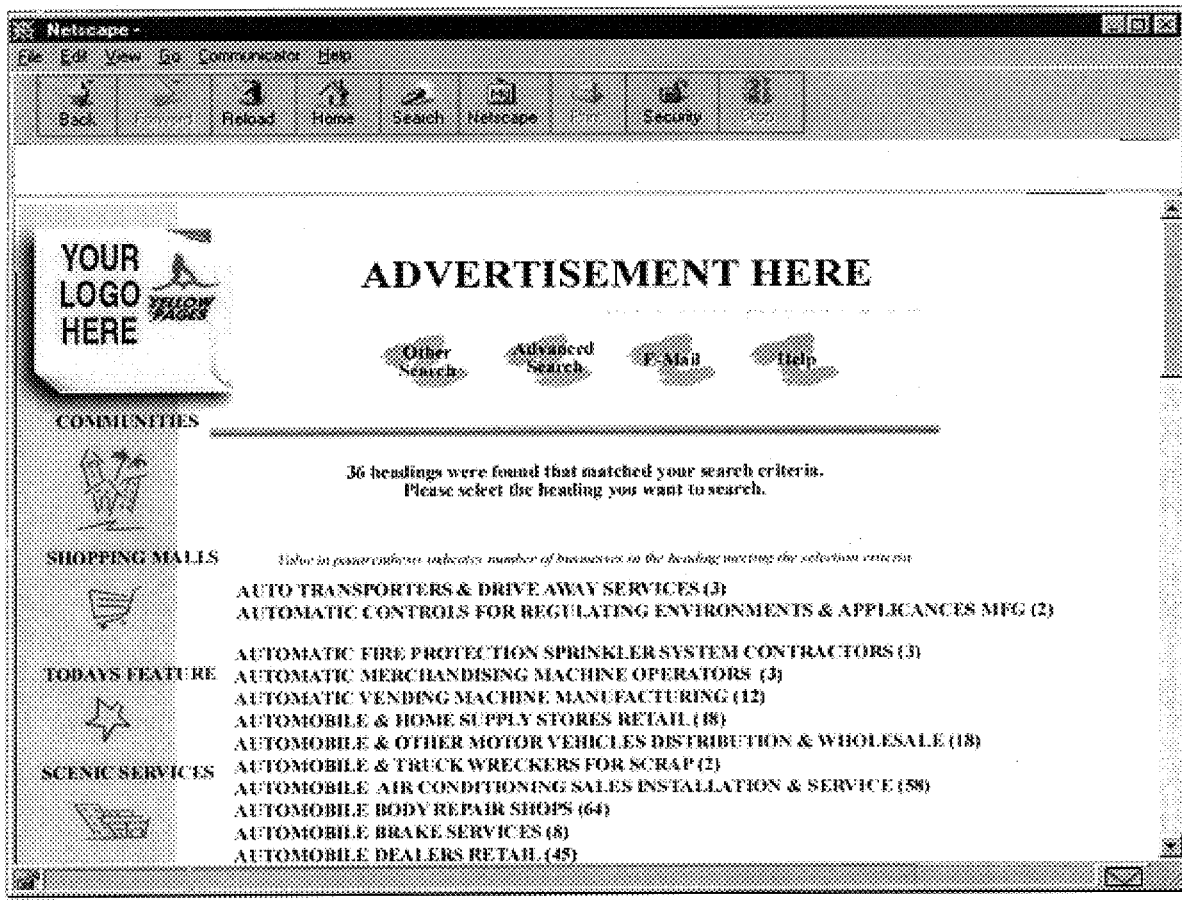
FIG. 3 is an illustration of a Web browser displaying an example Online Yellow Pages directory listing for the top-level search results.
Figure 4:
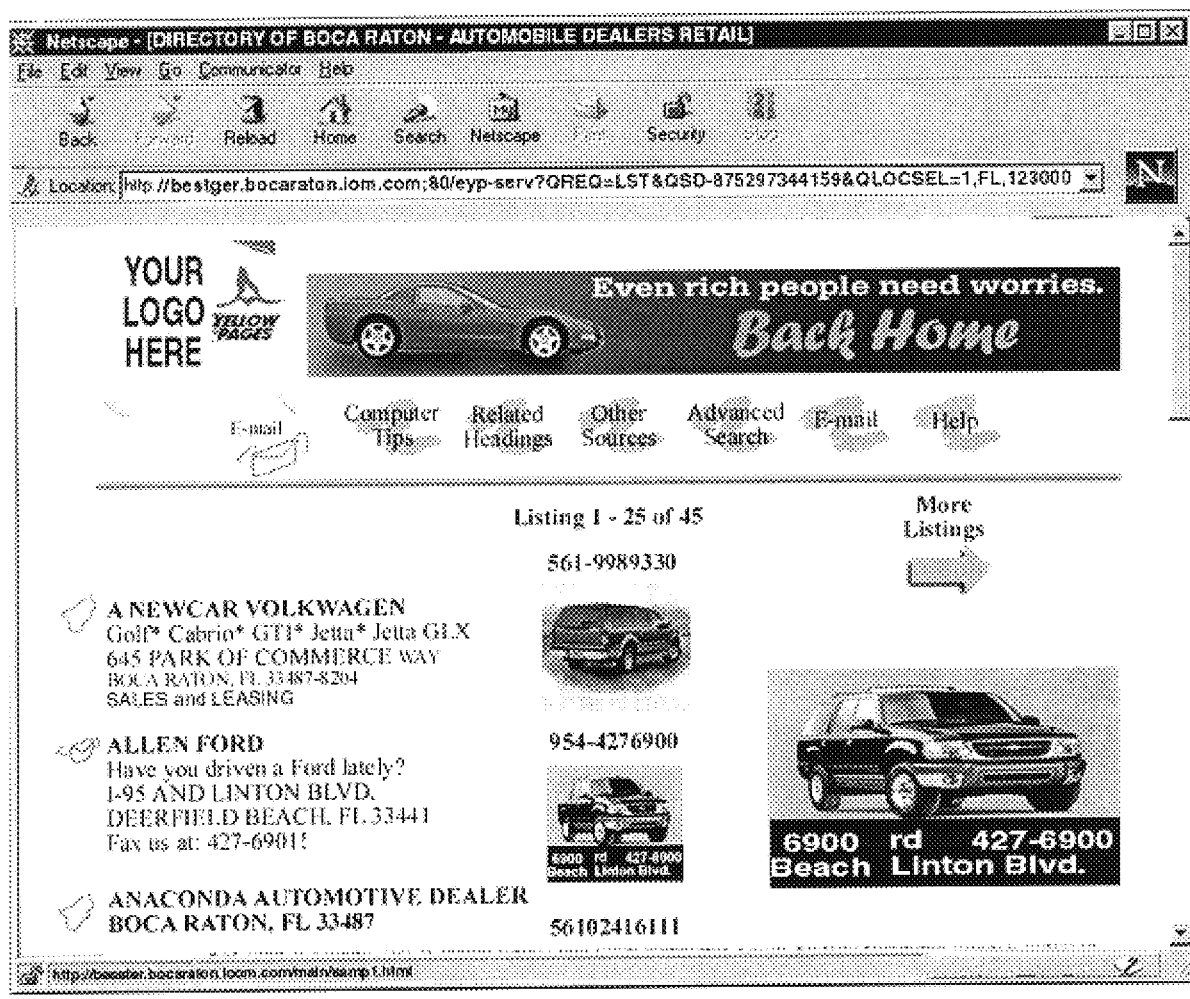
FIG. 4 is an illustration of a Web browser displaying an example Online Yellow Pages directory listing for the next level search results.

The Online directory listings system 10 is connected to Web browser 60, which provides an end-user the ability to enter a desired search criteria. Web browser 60 through Internet 50, communicates with the Web server 40 to query the database server 20. The results of the query from database server 20 are then sent back, through the Web server 40 and over Internet 50, to the end-user browser 60. FIG. 3 illustrates a typical Yellow Pages directory listing service interface rendered on Web browser 60. Here the results for an example keyword query of "automobile" are depicted. Typically, unless the end-user requested a more narrow or restrictive search, the end-user will select from among the listing headings displayed. Suppose in this example the user chooses "automobile dealerships." FIG. 4 depicts the results of this user preference. This listing in FIG. 4 contains the same basic information of the name, address and telephone number listed in the traditional paper Yellow Page counterpart. At this point all the traditional Online directory listing information has been provided to the end user.

The method for permitting business and organizations to customize their advertisement in Online directory listings consists of: creating (or revising) multimedia advertisement material using any of a widely available HTML (Hyper Text Markup Language) tools; importing the resulting HTML source and associated multimedia files into production database 26 of database server 20; and Associating through the database server 20 the HTML source files and multimedia files to the targeted business or organization.

From the above disclosure it should be understood that the advertisement for a business or organization has now been customized in the Online directory listing. Returning to the previous "automobile" keyword example, in FIG. 5 an end-user can now proceed beyond just the traditional Online directory listings and now request to view more specific information for a particular business listings. An example of a business Web-based multimedia advertisement for an "automobile dealership" is shown. The information and content of this advertisement being created Online by the business itself and is automatically associated with its appropriate Online directory listing.

Facilitating the preview of a customized multimedia advertisement is accomplished by mirroring production database 26 with a staging database in FIG. 2. Here the information in the staging database 27 is a replica copy of the information of in the production database 26. A business or organization wishing to preview their customized multimedia advertisement material can select to have this material imported to the staging database 27. The advertisement of FIG. 5 can be reviewed in the staging database 27. An advertiser may wish to change text, displayed in FIG. 5 "A NEW CAR VOLKSWAGEN" to a different font, size or color.

Figure 5:
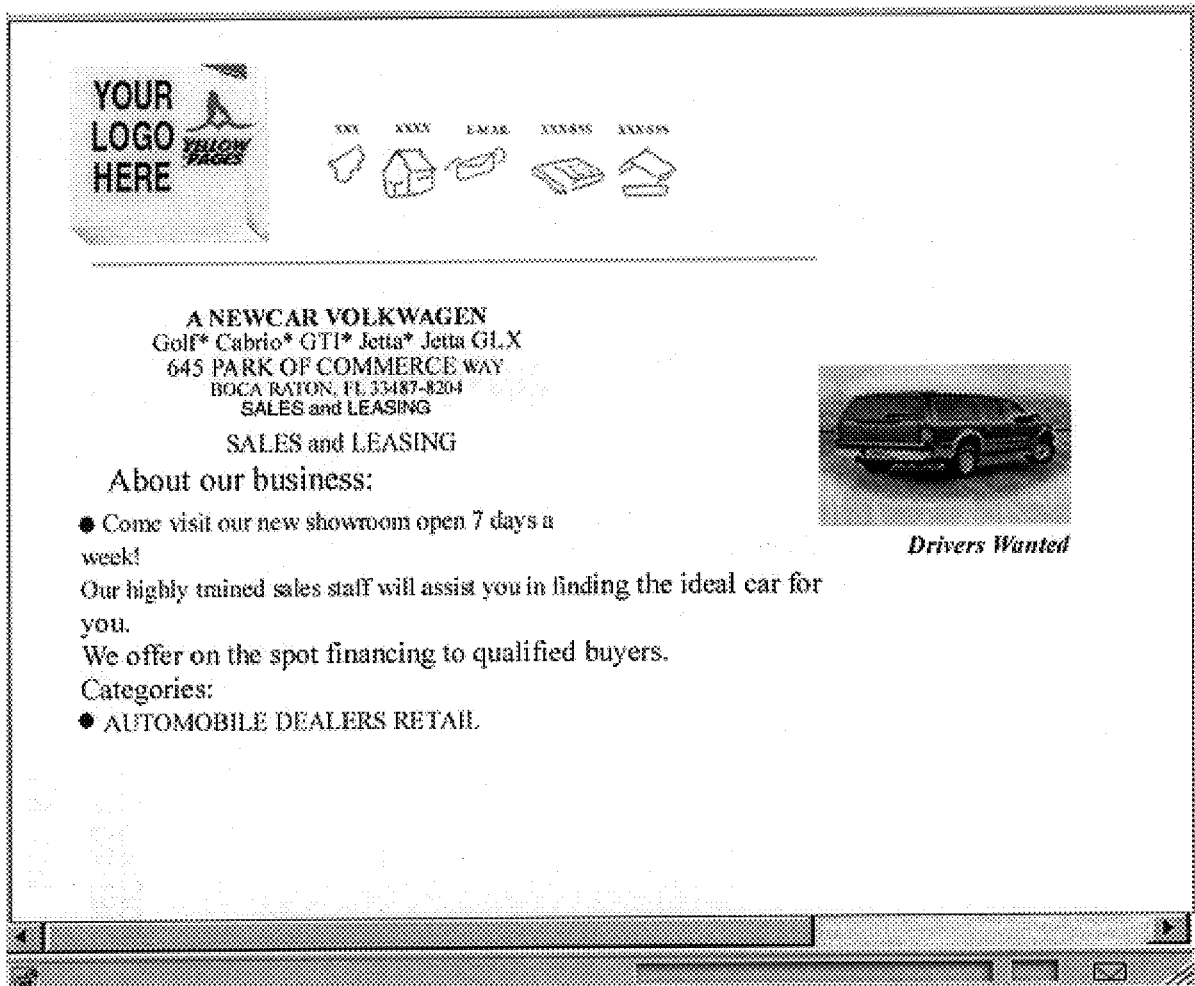
FIG. 5 is an illustration of a Web browser displaying a representative Web-based advertisement for a business listing in an example Online Yellow Pages directory listing.

Portions of a multimedia advertisement content of FIG. 5 may be modified, revised, deleted or edited by the business, the publisher or anyone else providing the Online listings. Portions may include any and all of the multimedia advertisement. The advertisement content is then riposted in staging database 27.

Once imported into the replica staging database the advertiser is enabled to preview their material for any errors, mistakes, or other undesirable advertisement attributes. Upon completing their review, these web pages are exported over to the production database 26. While the invention has been illustrated and described in the preferred embodiments, many modifications and changes therein may be affected by those skilled in the art. It is to be understood that the invention is not limited to the precise construction herein disclosed. Accordingly, the right is reserved to all changes and modifications coming within the true spirit and scope of the invention.

We claim:

1. An information processing system comprising:
   at least one database server linked to at least one Web server, said Web server comprising a plurality of Web browser clients connected thereto, said database server comprising a production database and a staging database;
   means for creating Web pages having multimedia data files and links to other Online data on at least one of said Web browser clients;
   means for importing said Web pages into said staging database of said database server;
   means for previewing said Web pages on said staging database on at least one of said Web browser clients;, as if said Web pages were running on said production database of said database server; and
   means for updating said production database of said database server with said Web pages that have been imported into said staging database of said database server.

2. The information processing system of claim 1 wherein said means for previewing said Web pages on said staging database further comprises:
   means for deleting each of said Web pages.

3. The information processing system of claim 1 wherein said means for previewing said Web pages on said staging database further comprises:
   means for updating said production data base with said Web pages.

4. The information processing system of claim 1 further comprising:
   said means for creating said Web pages on a separate information processing system and not connected to said Web server.

5. The information processing system of claim 1 wherein said means for importing includes importing of said Web pages submitted from said Web browser clients.

6. A method for previewing Web-based advertisements in an Online directory listing, comprising the steps of:
   linking at least one database server to at least one Web server, said database server comprising a production database and a staging database;
   creating Web pages having multimedia data files and links to other Online data on at least one of said Web browser clients;
   importing Web pages into said staging database of said database server;
   previewing said Web pages on said staging database on at least one of said Web browser clients as if said Web pages were running on said production database of said database server; and
   updating said production database of said database server with said Web pages that have been imported into said staging database of said database server.

7. The method for previewing custom Web-based advertisements in Online directory listings of claim 6 further comprising the steps of:
   selectively deleting portions of said custom multimedia Web pages.

8. The method for previewing custom Web-based advertisements in Online directory listings of claim 6 further comprising the steps of:
   updating said production data base with said custom multimedia Web pages.

9. The method for previewing custom Web-based advertisements in Online directory listings of claim 6 further comprising the steps of:
   creating on a separate information processing system custom multimedia Web pages having associated multimedia data files and associated links to other Online data.

10. The method for previewing custom Web-based advertisements in Online directory listings of claim 6 further comprising the steps of:
    importing custom Web pages submitted from said Web browser clients having associated multimedia data files and associated links to other Online data into said database server.

11. The method for previewing custom Web-based advertisements in Online directory listings of claim 6 further comprising the steps of:

importing pointers pointing to said custom Web pages having associated multimedia data files and associated links to other Online data into said database server such that said Web pages are hosted on another information processing system.

12. A computer-readable storage medium containing instructions for previewing custom Web-based advertisements in an Online directory listing comprising the instructions of:

linking at least one database server to at least one Web server, said database server comprising a production database and a staging database;

creating custom multimedia Web pages having multimedia data files and links to other Online data on at least one of said Web browser clients;

importing said Web pages into said staging database of said database server;

previewing said Web pages on said staging database on at least one of said Web browser clients as if said Web pages were running on said production database of said database server; and updating said production database of said database server with said Web pages that have been imported into said staging database of said database server.

13. The computer-readable storage medium of claim 12 further comprises the instruction for:

selectively deleting portions of said Web pages.

14. The computer-readable storage medium of claim 12 further comprising the instruction for:

updating said production data base with said Web pages.

15. The computer-readable storage medium of claim 12 further comprising the instruction for:

creating on a separate information processing system Web pages having multimedia data files and links to other Online data.

16. The computer-readable storage medium of claim 12 further comprises the instruction for:

importing Web pages submitted from said Web browser clients having multimedia data files and links to other Online data into said database server.

17. The computer-readable storage medium of claim 12 further comprises the instruction for:

importing pointers pointing to said Web pages having multimedia data files and links to other Online data into said database server such that said Web pages are hosted on another information processing system.

18. An information processing system comprising:

at least one Web server;

a plurality of Web browser clients connected to said Web server;

at least one database server linked to said Web server;

a first interface in said database server for coupling to a production database;

a second interface in said database server for coupling to a staging database;

means for importing from one or more Web browser clients into said staging database custom multimedia Web pages having multimedia data files and links to other Online data;

means for updating said production database of said database server with said Web pages that have been imported into said staging database of said database server; and means for receiving an authorization on said database server from said Web browser clients to update said production database on said database server from said staging database on said database server during previewing of said Web pages on said staging database of said database server, wherein said previewing is presented as if said Web pages were running on said production database of said database server.

19. A method for allowing online directory producers to preview their custom multimedia Web pages in an online directory system comprising the steps of:

linking at least one database server at least one Web server wherein said Web server is coupled to one or more clients;

coupling a first interface to a production database;

coupling a second interface to a staging database;

creating custom multimedia Web pages having multimedia data files and links to other Online data on said clients;

importing said Web pages from said clients into said staging database of said database server;

presenting said Web pages on said clients, wherein said staging database presents said Web pages as if said Web pages were running on said production database of said database server;

updating said production database of said database server with said Web pages that have been imported into said staging database of said database server; and receiving an authorization from said client after previewing said Web pages to update said production database of said database server by moving said Web pages from said staging database of said database server over to said production database of said database server.

* * * * *